350-409 SR

E297A XR 3,473,067

Oct. 14, 1969 G. RITTMAYER 3,473,067

HEMISPHERICAL LUMINESCENCE DIODE PRODUCING
A REAL IMAGE OF THE P-N JUNCTION

Filed March 21, 1967

United States Patent Office 3,473,067

Patented Oct. 14, 1969

3,473,067

HEMISPHERICAL LUMINESCENCE DIODE PRODUCING A REAL IMAGE OF THE P-N JUNCTION

Gerhard Rittmayer, Erlangen, Germany, assignor to Siemens Aktiengesellschaft, a corporation of Germany Filed Mar. 21, 1967, Ser. No. 624,792
Claims priority, application Germany, Mar. 23, 1966, S 102,685
Int. Cl. H01j *1/62, 63/04*
U.S. Cl. 313—108 7 Claims

ABSTRACT OF THE DISCLOSURE

A luminescence diode for radiating light through an optical imaging system has a semiconductor body comprising the first element of the optical imaging system. The semiconductor body comprises a lens portion and an extending portion extending from the lens portion. The extending portion has opposite conductivity type areas forming a p-n junction which has a radiating surface and is a distance from the lens portion determined so that the luminescence diode reproduces at a predetermined point in the optical imaging system a real image of the radiating surface of the p-n junction. The lens portion is of semispherical configuration having a point farthest from the p-n junction and a radius. The p-n junction is a distance from the farthest point of the lens portion which is greater than the radius of the lens portion by a factor determined by the indices of refraction of the medium in which the luminescence diode is positioned and of the semiconductor body.

The present invention relates to apparatus for producing and transmitting optical signals. More particularly, the invention relates to apparatus, including an electroluminescence diode and an optical imaging system in the radiation path, for producing and transmitting optical signals.

Known apparatus for producing and transmitting optical signals, especially the optical transmission of electrical magnitudes, utilize a luminescence diode as the transmission element for the production of a light signal. The radiation produced by the luminescence diode is transmitted to an appropriate receiving element by an optical imaging system such as, for example, a mirror or lens system, or glass fiber light conductors positioned in the radiation path.

A luminescence diode is a semiconductor diode with a p-n junction which emits unoriented incoherent electromagnetic radiation at the p-n junction and in its immediate vicinity, but particularly in the infrared or visible spectral regions, when voltage is applied in the forward direction. The III–V compounds are particularly suitable as semiconductor material for a luminescence diode. A luminescence diode of gallium arsenide, for example, emits radiation in the infrared region and a luminescence diode of gallium phosphide emits radiation in the visible spectral region. The wavelength of the emitted radiation depends upon the width of the forbidden energy band of the semiconductor material. Luminescence diodes are suitable for opto-electronic uses of various type, especially for converting electrical signals into light signals almost without delay. The light may then be transmitted in an optical manner. Luminescence diodes provide great advantages, particularly during the transmission of electrical magnitudes, such as measured values, across potential differences. Furthermore, optical transmission systems may utilize luminescence diodes in numerous cases instead of radio or cable connections.

It is very often necessary to provide considerable light intensity at the receiver of the optical signal transmission system. An arbitrary increase in the light intensity of the radiating p-n junction of the luminescence diode is limited by the limited current rating of said luminescence diode. It is therefore necessary to make the available light intensity of the luminescence diode as useful as possible for signal transmission by almost complete utilization of the radiation emitted by the p-n junction and by reduction of the losses of the optical imaging system.

The principal object of the present invention is to provide a new and improved apparatus for producing and transmitting optical signals. The apparatus of the present invention overcomes the disadvantages and shortcomings of the optical imaging system and thereby eliminates the The apparatus of the present invention transmits optical signals with efficiency, effectiveness and reliability. The apparatus of the present invention utilizes the semiconductor body of a luminescence diode as the first element of the optical imaging system and thereby eliminates the need for a lens or mirror which is required in a known optical imaging system. This reduces the light losses occurring in the optical imaging system due to reflection or absorption. Furthermore, the semiconductor body bunches the non-oriented radiation emitted by the p-n junction of the luminescence diode thereby permitting the utilization of a larger optical angle for signal transmission than that utilized in known optical imaging systems.

In accordance with the present invention, apparatus for producing and transmitting optical signals comprises an optical imaging system and a luminescence diode for radiating light through the optical imaging system. The luminescence diode has a semiconductor body comprising the first element of the optical imaging system. The semiconductor body of the luminescence diode comprises a lens portion and an extending portion extending from the lens portion. The extending portion has opposite conductivity type areas forming a p-n junction in the extending portion. The lens portion has a determined configuration of determined dimensions. The p-n junction has a radiating surface and is a distance from the lens portion determined so that the luminescence diode reproduces at a predetemined point in the optical imaging system a real image of the radiating surface of the p-n junction. The lens portion of the semiconductor body has the shape of a spherical segment and is preferably of semispherical configuration having a point farthest from the p-n junction and a radius. The p-n junction is a distance from the farthest point of the lens portion which is greater than the radius of the lens portion by a factor $n_2/n_2-n_1$, where $n_1$ is the index of reflection of the medium in which the luminescence diode is positioned and $n_2$ is the index of refraction of the semiconductor body.

In order that the present invention may be readily carried into effect, it will now be described with reference to the accompanying drawing, wherein.

Figure 1:
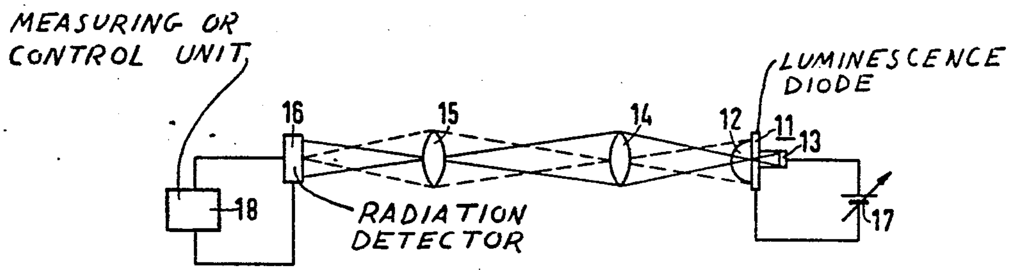
FIG. 1 is a schematic diagram of an embodiment of the apparatus of the present invention for producing and transmitting optical signals.

The apparatus of FIG. 1 comprises a luminescence diode 11 having a lens portion 12 and a p-n junction 13. A pair of lenses 14 and 15 are interposed between the luminescence diode 11 and a radiation detector 16. The optical imaging system comprises the lens portion 12 of the luminescence diode 11 and the two lenses 14 and 15.

The radiating surface of the p-n junction 13 of the luminescence diode 11 is reproduced by the lens portion 12 of said luminescence diode and transmitted to the lens 14. The lens 14 transmits the light to the photosensitive or radiation-sensitive surface of the radiation or photo detector 16 via the lens 15. A variable current source 17 is connected to the luminescence diode and biases said luminescence diode to produce light. The radiation detector or photo detector 16 converts the light impinging on its photosensitive surface into electrical signals, which are supplied to a measuring or control unit 18.

The lenses 14 and 15 may be replaced by a light conductor comprising a bunch of glass fibers mounted with the output opening directly upon the photosensitive surface of the radiation detector 16. In this case, the radiating surface of the p-n junction 13 is reproduced by the lens portion 12 of the luminescence diode upon the input opening of the light conductor at the lens 14 position. If the optical transmission path does not have to be very long, the lenses 14 and 15 may be dispensed with and the radiation detector 16 may be arranged at the lens 14 position. The radiating surface of the p-n junction 13 of the luminescence diode 11 is then reproduced by the lens portion 12 directly upon the radiation-sensitive surface of the photo or radiation detector 16.

Figure 2:
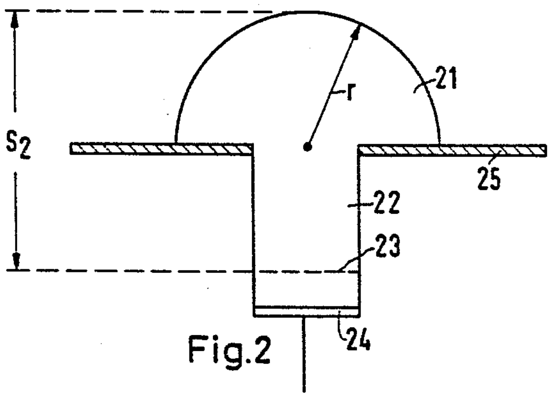
FIG. 2 is a schematic diagram of an embodiment of a luminescence diode which may be utilized as the luminescence diode of the apparatus of FIG. 1.

In FIG. 2, the semiconductor body of the luminescence diode 11 (FIG. 1) comprises a hemispherical or semispherical lens portion 21 and a handle-like extending potrion 22. The p-n junction 23 is in the handle-shaped extending portion of the semiconductor body. The variously doped portions of the luminescence diode are provided with contacts 24 and 25. If the semiconductor body of the luminescence diode is gallium arsenide, the contact 25, which is on the larger, *n* conductivity type part of the semiconductor body, may comprise a perforated disc of tin-plated Kovar sheet, for example. The tin-plated Kovar sheet is alloyed onto the semiconductor body and simultaneously functions as a cooling sheet. The contact 24 on the *p* conductivity type part of the semiconductor body may comprise, for example, indium, which is alloyed into the semiconductor body. The radius of the semispherical or hemispherical lens portion 21 is indicated as $r$ and the distance of the p-n junction 23 from the farthest point of said hemispherical lens portion is indicated as $S_2$.

There is a simple relation between the radius of the semispherical lens portion of a luminescence diode, the distance of the image from the point of the lens portion farthest from the p-n junction and the distance of the p-n junction from said farthest point of the lens portion. This relation is illustrated in detail in FIG. 3.

Figure 3:
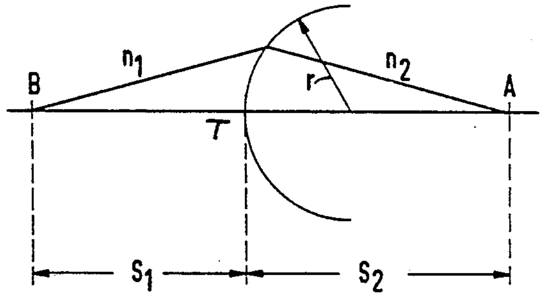
FIG. 3 is a geometric presentation of the operation of the luminescence diode of FIG. 2.

In FIG. 3, the p-n junction (13 of FIG. 1) is located at a point A at a distance $S_2$ from the farthest point T of the len sportion (21 in FIG. 2). The lens portion has a radius $r$. The image of the radiating surface of the p-n junction (23 in FIG. 2) should be produced at the location B at a distance $S_1$ from the farthest point T of the lens portion. The semiconductor body of the luminescence diode has an index of refraction $n_2$. The medium such as, for example, air, bordering the hemisphere has an index of refraction $n_1$.

The equation for the production at the point B of the image of the radiating surface of the p-n junction of the luminescence diode located at the point A is $$\frac{n_2}{S_2}+\frac{n_1}{S_1}=\frac{n_2-n_1}{r}$$

At a predetermined image distance $S_1$, the important data $r$ and $S_2$, required for producing the luminescence diode, may be derived from the equation. Thus, for example, the distance $S_1$, which is determined by the intended use of the luminescence diode, may be varied at a constant radius $r$ by an appropriate selection of the distance $S_2$. For a distance $S_1$ which approaches infinity, the lowest possible value obtainable for the distance $S_2$ is $$S_2=r\frac{n_2}{n_2-n_1}$$

The distance $S_2$ should be at least equal to the foregoing equation in order to produce a real image of the radiating surface of the p-n junction of the luminescence diode.

The foregoing equations apply strictly only for light rays close to the axis. Since, in accordance with the present invention, no particular value is placed upon the image quality in connection with the luminescence diode, but only upon the light intensity, the occurring opening errors must be accepted. If, in a special case, it is desired to eliminate the image errors, the semispherical lens portion of the luminescence diode may be replaced by another, more suitable, lens portion of different geometrical configuration. The determining magnitudes for a lens portion of a luminescence diode which deviates from a spherical configuration, may be calculated.

A suitable luminescence diode for reproducing the radiating surface of the p-n junction on the first lens of the optical imaging system of the present invention may comprise gallium arsenide and may have a semispherical lens portion with a radius $r$ of 1 mm. The distance $S_2$ of the p-n junction from the farthest point T of the semispherical lens portion is 1.41 mm. The real image of the radiating surface of the p-n junction is produced at a distance $S_1$ or 14.5 mm. from the farthest point T of the semispherical lens portion. The enlargement is 38 fold. An image 18 mm. in diameter is produced at the first lens for a diameter of the radiating surface of the p-n junction of 0.4 mm., said first lens being at a distance of 14.5 mm. from the farthest point of the hemispherical lens portion.

A suitable luminescence diode for reproducing the radiating surface of the p-n junction on the end surface of a light conductor comprising glass fibers may comprise gallium arsenide and may have a semispherical lens portion with a radius $r$ of 1 mm. The distance $S_2$ of the p-n junction from the farthest point T of the semispherical lens portion is 1.64 mm. The real image of the radiating surface of the p-n junction is produced at a distance $S_1$ of 2.2 mm. from the farthest point T of the semispherical lens portion. The enlargement is 5 fold. An image 3.5 mm. in diameter is produced at the end surface of the light conductor for p-n junction diameter of 0.7 mm., said end surface being at a distance of 2.2 mm. from the farthest point of the lens portion.

The dimensions of the two gallium-arsenide luminescence diodes described as examples are derived from the aforementioned equations if the index of refraction of gallium arsenide is assumed as $n_2=3.7$ and the index of refraction of air is $n_1=1$.

The enlargement obtained during reproduction is $$V=\frac{S_1}{S_2}\cdot\frac{n_2}{n_1}$$

The apparatus of the present invention has many uses. It may be used for signal transmission for control or measuring purposes, or for transmitting television signals over short distances which are inaccessible to cable connections.

In the present disclosure, "reproduction" is defined as the production of a real image of the radiating surface of the p-n junction at a point outside the semiconductor body of the luminescence diode. As hereinbefore described, the location of the true image is determined mainly principally by the position of the p-n junction in the handle-like extending portion of the semiconductor body, that is, by the distance of the p-n junction from the farthest point of the lens portion. Thus, during the production of the luminescence diode, the position of the p-n junction is so determined in the extending portion of the semi-conductor body that the real image is reproduced at a determined distance from the farthest point of the lens portion. The distance is selected in accordance with the intended use of the luminescence diode.

The distance of the p-n junction from the farthest point of the lens portion may be arbitrarily varied during the production of the luminescence diode. Thus, for example, the p-n junction may be produced first in a small semiconductor plate by indiffusing a dopant and the extending portion may then be produced by removing the excess semiconductor material. The lens portion is produced last, by grinding and/or polishing. Due to its relatively small area, the p-n junction is an almost pin point light source of very high intensity or brightness.

The lens portion may be of other than hemispherical configuration if its configuration suitably produces an image of the radiating surface of the p-n junction. A suitable configuration of the lens portion may comprise, for example, a paraboloid. A hemispherical lens portions may be utilized to avoid a total reflection of the light emitted by the p-n junction and the contact surface between the semiconductor body and the surrounding medium such as air rather than to reproduce the radiating surface of the p-n junction. This is the case when the shape and size of the lens portion of the semiconductor body and the position of the p-n junction are not in the relation of the present invention to each other and a real image of the radiating surface of the p-n junction is not produced.

While the invention has been described by means of specific examples and in a specific embodiment, I do not wish to be limited thereto, for obvious modifications will occur to those skilled in the art without departing from the spirit and scope of the invention.

I claim:

1. Apparatus for producing and transmitting optical signals, comprising
an optical imaging system; and
a luminescence diode for radiating light through said optical imaging system, said luminescence diode having a semiconductor body having a part including a p-n junction having a radiating surface and a lens part producing a real image of the radiating surface of said p-n junction, said luminescence diode being the first element of said optical imaging system.

2. Apparatus as claimed in claim 1, wherein the semiconductor body of said luminescence diode comprises a lens portion and an extending portion extending from said lens portion and having opposite conductivity type areas forming a p-n junction in said extending portion, said lens portion having a determined configuration of determined dimensions and said p-n junction having a radiating surface and being a distance from said lens portion determined so that said luminescence diode reproduces at a predetermined point in said optical imaging system a real image of the radiating surface of said p-n junction.

3. Apparatus as claimed in claim 2, wherein the lens portion of said semiconductor body has the shape of a spherical segment.

4. A luminescence diode, comprising a semiconductor body having a lens portion and an extending portion extending from said lens portion and having opposite conductivity type areas forming a p-n junction in said extending portion, said lens portion having a determined configuration of determined dimensions and said p-n junction having a radiating surface and being a distance from said lens portion determined so that said luminescence diode reproduces at a predetermined point spaced therefrom a real image of the radiating surface of said p-n junction.

5. Apparatus as claimed in claim 4, wherein the lens portion of said semiconductor body is of hemispherical configuration.

6. Apparatus for producing and transmitting optical signals, comprising
an optical imaging system; and
a luminescence diode for radiating light through said optical imaging system, said luminescence diode having a semiconductor body comprising a lens portion and an extending portion extending from said lens portion and having opposite conductivity type areas forming a p-n junction in said extending portion, said lens portion having a semispherical configuration having a point farthest from said p-n junction and a radius, said p-n junction being a distance from the farthest point of said lens portion which is greater than the radius of said lens portion at least by a factor $n_2/n_2-n_1$, where $n_1$ is the index of refraction of the medium in which said luminescence diode is positioned and $n_2$ is the index of refraction of the semiconductor body, said p-n junction having a radiating surface and said luminescence diode reproducing at a predetermined point in said optical imaging system a real image of the radiating surface of said p-n junction.

7. A luminescence diode, comprising a semiconductor body having a lens portion and an extending portion extending from said lens portion and having opposite conductivity type areas forming a p-n junction in said extending portion, said p-n junction having a radiating surface and the lens portion of said semiconductor body being of a hemispherical configuration having a point farthest from said p-n junction and a radius, said p-n junction being a distance from the farthest point of said lens portion which is greater than the radius of said lens portion at least by a factor $n_2/n_2-n_1$, where $n_1$ is the index of refraction of the medium in which said luminescence diode is positioned and $n_2$ is the index of refraction of the semiconductor body, said luminescence diode reproducing at a predetermined point spaced therefrom a real image of the radiating surface of said p-n junction.

References Cited

UNITED STATES PATENTS

| | | | |
|---|---|---|---|
| 2,861,165 | 11/1958 | Aigrain et al. | 219—34 |
| 3,302,051 | 1/1967 | Galginaitis | 313—108 |
| 3,304,430 | 2/1967 | Biard et al. | 317—235 |

OTHER REFERENCES

Sunners, B.: Mount for Light-Emitting Diode, IBM Technical Disclosure Bulletin, vol. 8, No. 7, p. 1015, December 1965.

Roy and Yeh: Gallium-Arsenide Light-Emitting Diode, IBM Technical Disclosure Bulletin, vol. 7, No. 1, pp. 61–62, June 1964.

JAMES W. LAWRENCE, Primary Examiner

E. R. LA ROCHE, Assistant Examiner

U.S. Cl. X.R.

250—217; 317—235